(12) United States Patent
Kim et al.

(10) Patent No.: US 10,026,239 B2
(45) Date of Patent: Jul. 17, 2018

(54) APPARATUS AND METHOD FOR FAILURE DIAGNOSIS AND CALIBRATION OF SENSORS FOR ADVANCED DRIVER ASSISTANCE SYSTEMS

(71) Applicant: HYUNDAI MOTOR COMPANY, Seoul (KR)

(72) Inventors: Jun Soo Kim, Seoul (KR); Min Wook Seo, Suwon-si (KR); Joo Woong Yang, Seoul (KR); Sung Yun Kim, Seoul (KR); Dong Hun Yang, Anyang-si (KR); Bong Chul Ko, Hwaseong-si (KR); Gil Won Seo, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 112 days.

(21) Appl. No.: 15/202,988

(22) Filed: Jul. 6, 2016

(65) Prior Publication Data

US 2017/0169627 A1 Jun. 15, 2017

(30) Foreign Application Priority Data

Dec. 9, 2015 (KR) .......................... 10-2015-0174798

(51) Int. Cl.
*G01S 7/00* (2006.01)
*G05B 23/00* (2006.01)
(Continued)

(52) U.S. Cl.
CPC .............. *G07C 5/0808* (2013.01); *G01S 7/00* (2013.01); *G05B 23/00* (2013.01); *G05D 1/0248* (2013.01);
(Continued)

(58) Field of Classification Search
CPC .... G07C 5/08; G07C 5/00808; G07C 5/0825; G05D 1/02; G05D 1/0278; G05D 1/0255; G05D 1/0257; G05D 1/0248
See application file for complete search history.

(56) References Cited

U.S. PATENT DOCUMENTS 8,527,141 B2 9/2013 Takahashi
8,731,769 B2 5/2014 Hsu et al.
(Continued)

FOREIGN PATENT DOCUMENTS

EP      2187223 B1    1/2014
JP      2008-175721 A 7/2008
(Continued)

OTHER PUBLICATIONS

Korean Office Action dated Apr. 7, 2017, issued in Korean Patent Application No. 10-2015-0174798.

*Primary Examiner* — Yonel Beaulieu
*Assistant Examiner* — Martin A Weeks
(74) *Attorney, Agent, or Firm* — McDermott Will & Emery LLP (57) ABSTRACT

An apparatus for failure diagnosis and calibration of sensors for advanced driver assistance systems (ADAS) includes a measuring unit including two or more sensors mounted in a vehicle a storage for storing characteristic data of each of the two or more sensors, and a processor for selecting one of the two or more sensors as a reference sensor and for determining whether or not a failure of the other sensor to be diagnosed is detected and whether calibration thereof is required, on the basis of error covariance information of the reference sensor.

16 Claims, 7 Drawing Sheets

(51) Int. Cl.
*G07C 5/08* (2006.01)
*G05D 1/02* (2006.01)

(52) U.S. Cl.
CPC ......... *G05D 1/0255* (2013.01); *G05D 1/0257* (2013.01); *G05D 1/0278* (2013.01); *G07C 5/0825* (2013.01)

(56) References Cited

U.S. PATENT DOCUMENTS

| | | | |
|---|---|---|---|
| 2010/0131140 A1 | 5/2010 | Wu et al. | |
| 2010/0168957 A1* | 7/2010 | Takahashi | G01S 7/497 701/29.2 |
| 2012/0083982 A1* | 4/2012 | Bonefas | G05D 1/0223 701/70 |
| 2015/0279129 A1* | 10/2015 | Ishikawa | B60K 35/00 701/29.1 |
| 2016/0107765 A1* | 4/2016 | Dani | B64D 45/00 701/29.1 |

FOREIGN PATENT DOCUMENTS

| | | |
|---|---|---|
| JP | 2009-241884 A | 10/2009 |
| JP | 2010-008055 A | 1/2010 |
| JP | 2011-002355 A | 1/2011 |
| KR | 10-2009-0049196 A | 5/2009 |
| KR | 10-1469561 B1 | 12/2014 |
| KR | 10-1491849 B1 | 2/2015 |

\* cited by examiner

FIG. 7 ial drive assistance systems

APPARATUS AND METHOD FOR FAILURE DIAGNOSIS AND CALIBRATION OF SENSORS FOR ADVANCED DRIVER ASSISTANCE SYSTEMS

CROSS-REFERENCE TO RELATED APPLICATION

This application claims the benefit of priority to Korean Patent Application No. 10-2015-0174798, filed on Dec. 9, 2015 with the Korean Intellectual Property Office, the disclosure of which is incorporated herein in its entirety by reference.

TECHNICAL FIELD

The present disclosure relates to an apparatus and a method for failure diagnosis and calibration of sensors for advanced driver assistance systems (ADAS) that can implement the failure diagnosis and error calibration of the sensors used in ADAS.

BACKGROUND

In recent years, various types of advanced driver assistance systems (ADAS) have been developed for the convenience and safety of drivers. For example, various systems, such as a smart cruise control (SCC) system that automatically adjusts the vehicle speed to maintain a safe distance from vehicles ahead, a lane keeping assist system (LKAS) that helps keep a vehicle into its lane through control of steering when a driver leaves, or nearly leaves, the lane without turn signal activation, and a smart parking assist system (SPAS) that automatically parks a vehicle instead of a driver by recognizing a parking space, are being applied to vehicles. Further, the applications and functions thereof are gradually being expanded. Such systems may be provided with various types of sensors, such as a radio detection and ranging (RADAR) sensor, a light detection and ranging (LiDAR) sensor, a camera, and an ultrasonic sensor, so as to recognize a driving environment and provide assistance in accordance with driving conditions.

ADAS performs auxiliary controls with respect to acceleration and deceleration, steering, and the like of vehicles on the basis of information about a surrounding environment, such as a distance and a speed obtained by sensors. Therefore, the calibration of errors by determining whether or not the sensors have malfunctioned in real time may be essential for ADAS.

However, high-priced evaluation equipment and calibration equipment is required in order to implement the calibration of errors by determining whether or not the sensors have malfunctioned.

SUMMARY

The present disclosure has been made to solve the above-mentioned problems occurring in the prior art while advantages achieved by the prior art are maintained intact.

An aspect of the present disclosure provides an apparatus and a method for failure diagnosis and calibration of sensors for advanced driver assistance systems (ADAS) that can implement the failure diagnosis and error calibration of the sensors used in ADAS.

According to an aspect of the present disclosure, an apparatus for failure diagnosis and calibration of sensors for ADAS may include: a measuring unit including two or more sensors mounted in a vehicle; a storage for storing characteristic data of each of the two or more sensors; and a processor for selecting one of the two or more sensors as a reference sensor and for determining whether or not failure of the other sensor to be diagnosed is detected and calibration thereof is required, on the basis of error covariance information of the reference sensor.

The two or more sensors may measure homogeneous data with respect to an object positioned in a common measurement area of the two or more sensors.

The reference sensor may be any one of a global positioning system (GPS) sensor, an ultrasonic sensor, a radio detection and ranging (RADAR) sensor, a light detection and ranging (LiDAR) sensor, and a camera.

The characteristic data may include a mounting position, a measuring range, and error covariance information of the reference sensor.

The processor may include: a reference selection module for selecting the reference sensor by analyzing reliability of the two or more sensors; a diagnosis module for comparing measured data of the reference sensor with measured data of the sensor to be diagnosed, and for determining whether or not the degree of error is out of an allowable error range, and for determining whether or not the failure of the sensor to be diagnosed is detected and the calibration thereof is required; and a calibration module for calibrating a calibration parameter of the sensor to be diagnosed on the basis of the measured data of the reference sensor, when the diagnosis module determines that the calibration of the sensor to be diagnosed is required.

The reference selection module may analyze the reliability by using accuracy with respect to the measured data of the two or more sensors.

The reference selection module may analyze the reliability by using accuracy according to specifications of respective sensors.

The diagnosis module may calculate covariance intersection of the error covariance information of the reference sensor and error covariance information of the sensor to be diagnosed to calculate an allowable error range for determining whether or not the calibration of the sensor to be diagnosed is required.

The diagnosis module may calculate covariance union of the error covariance information of the reference sensor and error covariance information of the sensor to be diagnosed to calculate an allowable error range for determining whether or not the failure of the sensor to be diagnosed is detected.

The diagnosis module may calculate a Mahalanobis distance between the measured data of the reference sensor and the measured data of the sensor to be diagnosed to calculate measurement errors of the reference sensor and the sensor to be diagnosed.

The calibration module may calculate the calibration parameter that minimizes a difference between the measured data of the reference sensor and the measured data of the sensor to be diagnosed by using a cost function.

According to another aspect of the present disclosure, a method for failure diagnosis and calibration of sensors for ADAS may include: determining whether or not diagnostic conditions for initiating diagnosis of two or more sensors mounted in a vehicle are satisfied; selecting one of the sensors as a reference sensor by analyzing a reliability of the two or more sensors; determining whether or not failure of the other sensor to be diagnosed is detected and whether calibration thereof is required, on the basis of error covariance information of the reference sensor; and performing a process according to diagnostic results of the sensor to be diagnosed.

In the step of determining whether or not the diagnostic conditions are satisfied, it may be determined whether or not an object is present in a common measurement area of the two or more sensors.

The step of determining whether or not the failure of the sensor to be diagnosed is detected and the calibration thereof is required may include: calculating covariance intersection of the error covariance information of the reference sensor and error covariance information of the sensor to be diagnosed; verifying whether or not the degree of error between measured data of the reference sensor and measured data of the sensor to be diagnosed is out of an allowable error range set by the covariance intersection to determine whether or not the calibration is required; calculating covariance union of the error covariance information of the reference sensor and the error covariance information of the sensor to be diagnosed, when the calibration of the sensor to be diagnosed is required; verifying whether or not the degree of error between the measured data of the reference sensor and the measured data of the sensor to be diagnosed is out of an allowable error range set by the covariance union to determine whether or not there is probability of failure; counting the cumulative number of failure diagnoses of the sensor to be diagnosed, when there is the probability of failure of the sensor to be diagnosed; and verifying whether or not the number of failure diagnoses of the sensor to be diagnosed exceeds a threshold value to determine the failure of the sensor to be diagnosed.

The step of determining whether or not there is the probability of failure may further include: counting the number of requests for calibration of the sensor to be diagnosed unless there is the probability of failure of the sensor to be diagnosed; and verifying whether or not the number of requests for calibration of the sensor to be diagnosed exceeds a threshold value to determine that the calibration of the corresponding sensor is required.

The method may further include calculating a calibration parameter that minimizes a difference between the measured data of the reference sensor and the measured data of the sensor to be diagnosed by using a cost function, when it is determined that the calibration of the corresponding sensor is required.

The method may further include outputting information notifying the failure of the sensor to be diagnosed, when it is determined that the failure of the corresponding sensor is detected.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings.

Exemplary embodiments of the present disclosure may provide an apparatus and a method for performing fault diagnosis and calibration of sensors for advanced driver assistance systems (ADAS) using measured data and probability information of the sensors for ADAS, without separate additional devices.

Here, ADAS may include a smart parking assist system (SPAS), a smart cruise control (SCC) system, a lane keeping assist system (LKAS), and/or a blind spot detection (BSD) system.

Figure 1:
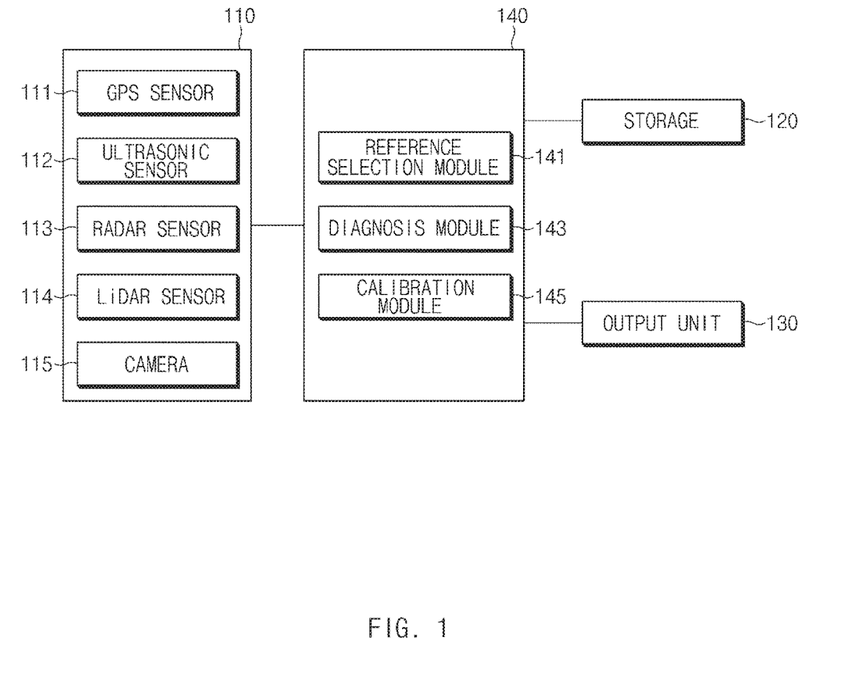
FIG. 1 illustrates a block diagram of a configuration of an apparatus for failure diagnosis and calibration of sensors for advanced driver assistance systems (ADAS) according to an exemplary embodiment of the present disclosure.
Figure 2:
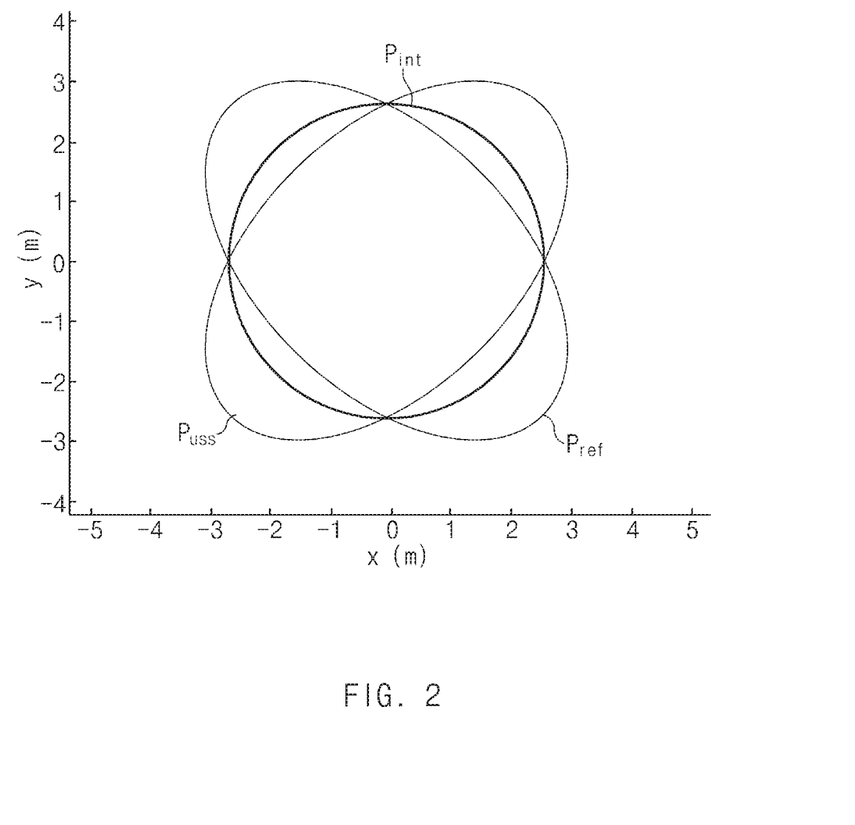
FIG. 2 is a graph illustrating a concept of covariance intersection according to an exemplary embodiment of the present disclosure.
Figure 3:
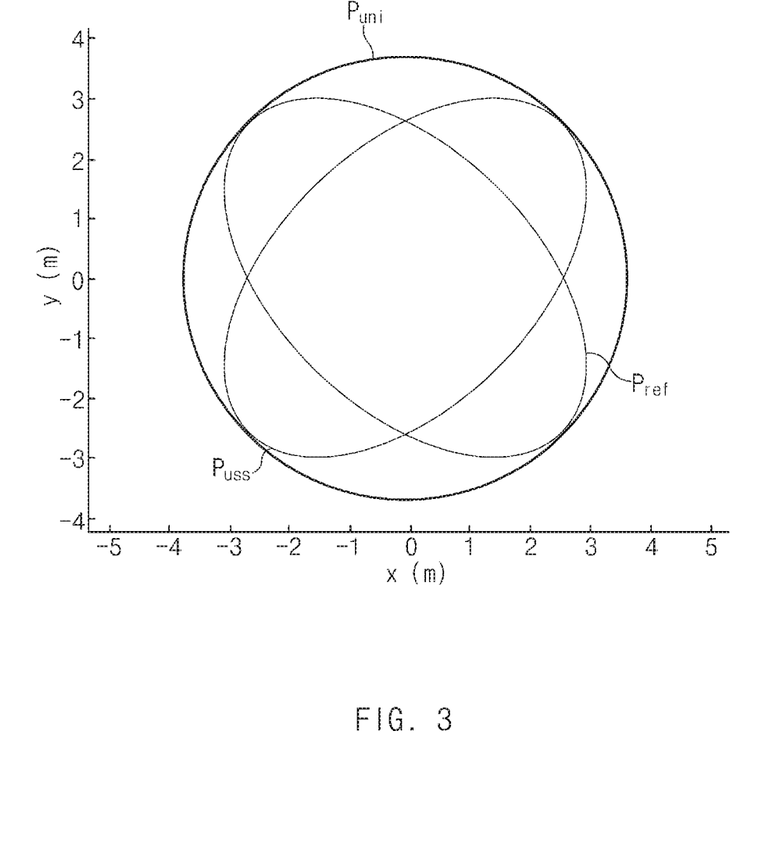
FIG. 3 is a graph illustrating a concept of covariance union according to an exemplary embodiment of the present disclosure.

FIG. 1 illustrates a block diagram of a configuration of an apparatus for failure diagnosis and calibration of sensors for ADAS, according to an exemplary embodiment of the present disclosure. FIG. 2 illustrates a concept of covariance intersection according to an exemplary embodiment of the present disclosure. FIG. 3 illustrates a concept of covariance union according to an exemplary embodiment of the present disclosure.

As illustrated in FIG. 1, the apparatus for fault diagnosis and calibration of sensors for ADAS may include a measuring unit 110, a storage 120, an output unit 130 and a processor 140.

The measuring unit 110 may measure surrounding environment information and behavior information of a vehicle. The measuring unit 110 may include a global positioning system (GPS) sensor 111, an ultrasonic sensor 112, a radio detection and ranging (RADAR) sensor 113, a light detection and ranging (LiDAR) sensor 114, a camera 115 and the like.

The GPS sensor 111 may be provided to measure (estimate) a current position of the vehicle. The GPS sensor 111 may measure an exact time and distance through three or more satellites to calculate the current position of the vehicle through triangulation of three respective different distances. The GPS sensor 111 may continue calculating the current position in real time to calculate speed information using the calculated current position.

At least one ultrasonic sensor 112 may be provided at the front, rear, front side, and/or rear side, and/or the like of the vehicle to measure distances between the vehicle and short-range obstacles that are positioned close to the vehicle.

The RADAR sensor 113 may be provided at the front, rear, and/or the like of the vehicle to measure relative distances and speed of moving obstacles (for example, other vehicles and motorcycles).

The LiDAR sensor 114 may be provided at the front and rear of the vehicle to measure exact distance and position information of long-range obstacles.

The camera 115 may provide distance information of obstacles such as pedestrians and other vehicles as well as lane information (lane position, curvature, type, and the like) in front of the vehicle. In addition, the camera 115 may also measure positions of the vehicle with respect to lanes or obstacles positioned close to the vehicle in all directions.

At least one camera 115 may be provided at the front, rear, and/or side of the vehicle, according to uses thereof, or each provided camera 115. For example, the camera 115 may include a front-view short-range camera and a front-view long-range camera provided at the front of the vehicle, and a rear-view short-range camera and a rear-view long-range camera provided at the rear of the vehicle, and an around view monitor (AVM) camera provided at the front, rear, and sides of the vehicle.

The camera 115 may be provided as at least one of image sensors such as a charge coupled device (CCD) image sensor, a metal oxide semiconductor (MOS) image sensor, a charge priming device (CPD) image sensor and/or a charge injection device (CID) image sensor.

The measuring unit 110 may provide measured data and error covariance information. The error covariance information may refer to a probabilistic reliability of the measured data of the sensors, which may indicate measurement error ranges of the sensors (error ranges according to the specifications and properties of the sensors).

The storage 120 may store characteristic data of the sensors in a database in advance. The storage 120 may store the characteristic data (sensor information) of respective sensors such as positions of the sensors mounted in the vehicle, and measurement ranges (a maximum value and a minimum value of sensor output) and measurement error ranges of the sensors.

The storage 120 may store various types of data generated according to a program for the operation of the processor 140 and the operations of the devices.

The storage 120 may be provided as at least one of storage media such as a flash memory, a hard disk, a secure digital (SD) card, a random access memory (RAM), a read only memory (ROM), and/or a web storage.

The output unit 130 may output information notifying a failure state of a sensor during, or after, the sensor failure. Here, the information may be output in the form of visual information, audible information, tactile information, and the like.

In addition, the output unit 130 may transmit the failure state of the sensor to another system utilizing sensor data. Here, the output unit 130 may transmit the failure state of the sensor to another system through a vehicle network. The vehicle network may be provided as a controller area network (CAN), a media oriented systems transport (MOST) network, a local interconnect network (LIN), an X-by-Wire system (FlexRay), or the like.

The output unit 130 may be provided as at least one of output devices such as a display device, an acoustic output device (for example, a speaker) and an oscillation output device. Here, the display device (not shown) may include at least one of a liquid crystal display (LCD), a thin film transistor-liquid crystal display (TFT LCD), an organic light emitting diode (OLED), a flexible display, a 3D display, a transparent display, a head-up display (HUD), a touchscreen and/or a cluster.

The processor 140 may diagnose the failure of a sensor in real time, and may calibrate the sensor by correcting errors. The processor 140 may include a reference selection module 141, a diagnosis module 143 and a calibration module 145.

The reference selection module 141 may determine whether or not an object (an obstacle) is present in a common measurement area of sensors and determine whether or not the sensors satisfy diagnostic conditions. In order words, when the object is present in the common measurement area of the sensors, the reference selection module 141 may determine that the diagnostic conditions are satisfied, and when the object is not present in the common measurement area of the sensors, the reference selection module 141 may determine that the diagnostic conditions are not satisfied.

The reference selection module 141 may select a reference sensor for failure diagnosis and calibration of the sensors when the diagnostic conditions are satisfied. The reference selection module 141 may select, as the reference sensor, a sensor having the highest accuracy (reliability) among two or more sensors that measure homogeneous data (for example, distance or speed) with respect to the same object positioned in the common measurement area. For example, the reference selection module 141 may select, as the reference sensor, any one of the ultrasonic sensor 112, the RADAR sensor 113, the LiDAR sensor 114, and the camera 115 that measures a distance from an obstacle, on the basis of the reliability of information sensed therefrom. In order words, the reference selection module 141 may analyze reliability of measured data of respective sensors to select the reference sensor.

In selecting the reference sensor, the analysis of reliability may be on the basis of the accuracy of the measured data provided by respective sensors. The accuracy of the measured data may refer to accuracy according to the specifications of respective sensors or according to results of processing the measured data of respective sensors. The accuracy according to the specifications of respective sensors may be obtained by storing accuracies according to sensor manufacturing tolerances or installation positions as separate data in advance. The accuracy according to the results of processing the measured data of the sensors may be real time reliability of recognized data that is transmitted together in transmitting data related to the results of recognizing, by the sensors, obstacles such as other vehicles, pedestrians, two-wheeled vehicles, and the like.

The diagnosis module 143 may determine whether or not calibration is required on the basis of a probabilistic model of the selected reference sensor. The diagnosis module 143 may calculate covariance intersection of error, covariance information of the reference sensor and error covariance information of a sensor to be diagnosed. As illustrated in FIG. 2, the covariance intersection $P_{int}$ may be an algorithm for fusion of different covariance information $P_{uss}$ and $P_{ref}$ through a weighted sum, in which a measurement error range $P_{ref}$ of the reference sensor and a measurement error range $P_{uss}$ of the sensor to be diagnosed are fused, or merged or combined, into one range.

The diagnosis module 143 may calculate the covariance intersection $P_{int}$ of the error covariance information of the reference sensor and the error covariance information of the sensor to be diagnosed by using the following equation 1:

$$P_{int}^{-1} = \omega P_{uss}^{-1} + (1-\omega) P_{ref}^{-1} \quad \text{[Equation 1]}$$

Here, $P_{uss}$ is the error covariance of the sensor to be diagnosed; $P_{ref}$ is the error covariance of the reference sensor; and $\omega$ is a weighting factor.

The diagnosis module 143 may verify whether or not the degree of error between the measured data of the reference sensor and the measured data of the sensor to be diagnosed is within a valid range (allowable error range). The diagnosis module 143 may calculate a Mahalanobis distance $D_{int}(Z_i)$ between the measured data of the reference sensor and the measured data of the sensor to be diagnosed by using equation 2:

$$D_{int}(Z_i) = [Z_{uss} - Z_{ref}]^T P_{int}^{-1} [Z_{uss} - Z_{ref}] \quad \text{[Equation 2]}$$

Here, $Z_{uss}$ is the measured data of the sensor to be diagnosed, and $Z_{ref}$ is the measured data of the reference sensor.

The diagnosis module 143 may verify whether or not the degree of error between the reference sensor and the sensor to be diagnosed, calculated by using equation 2, is within a validation gate $G_{\gamma,int}$ to determine whether or not calibration is required. In other words, the diagnosis module 143 may verify whether or not the measured data of the sensor to be diagnosed is within the validation gate (valid range, allowable error range) set by the covariance intersection to determine whether or not the data is valid.

When the degree of error between the measured data of the reference sensor and the measured data of the sensor to be diagnosed is within the valid range, the diagnosis module 143 may determine that the calibration of the sensor to be diagnosed is not required. When the degree of error between the measured data of the reference sensor and the measured data of the sensor to be diagnosed is out of the valid range, the diagnosis module 143 may determine that the calibration of the sensor to be diagnosed is required.

When the calibration of the sensor to be diagnosed is required, the diagnosis module 143 may calculate covariance union $P_{uni}$ of the error covariance of the reference sensor and the error covariance of the sensor to be diagnosed by using equation 3. As illustrated in FIG. 3, the covariance union may be an algorithm for data fusion in consideration of the error covariance of the reference sensor and the error covariance of the sensor to be diagnosed.

$$P_{uni} = \max(P_{uss}, P_{ref}) + (Z_{uss} - Z_{ref})(Z_{uss} - Z_{ref})^T \quad \text{[Equation 3]}$$

Here, $Z_{uss} - Z_{ref}$ is an error between the measured data of the reference sensor and the measured data of the sensor to be diagnosed.

The diagnosis module 143 may determine the probability of failure of the sensor to be diagnosed by using a valid range $G_{\gamma,uni}$ of the covariance union.

The diagnosis module 143 may verify whether or not the degree of error between the measured data of the reference sensor and the measured data of the sensor to be diagnosed is within the valid range (allowable error range) of the covariance union to determine the probability of failure.

The diagnosis module 143 may calculate a Mahalanobis distance $D_{uni}(Z_i)$, i.e., the degree of error between the measured data of the reference sensor and the measured data of the sensor to be diagnosed by using the following equation 4:

$$D_{uni}(Z_i) = [Z_{uss} - Z_{ref}]^T P_{uni}^{-1} [Z_{uss} - Z_{ref}] \quad \text{[Equation 4]}$$

When the Mahalanobis distance $D_{uni}(Z_i)$ is within a validation gate set by the covariance union, the diagnosis module 143 may determine that there is no probability of failure. When the Mahalanobis distance $D_{uni}(Z_i)$ is out of the validation gate, the diagnosis module 143 may determine that there is a probability of failure.

When there is the probability of failure of the sensor to be diagnosed, the diagnosis module 143 may count the number of failure diagnoses of the corresponding sensor. When the number of failure diagnoses exceeds a threshold value, the diagnosis module 143 may determine a failure of the corresponding sensor.

Meanwhile, when there is no probability of failure of the sensor to be diagnosed, the diagnosis module 143 may count the number of requests for calibration of the corresponding sensor. When the number of requests for calibration of the sensor to be diagnosed exceeds a threshold value, the diagnosis module 143 may determine that the calibration of the corresponding sensor is required.

When it is determined that the calibration of the sensor to be diagnosed is required, the calibration module 145 may calibrate parameters of the sensor to be diagnosed in real time by utilizing the measured data of the reference sensor as reference data. The calibration module 145 may compensate for errors of the corresponding sensor by varying importance according to covariance information of the measured data of the corresponding sensor during the calibration of the sensor.

The calibration module 145 may obtain calibration parameters $\alpha$ and $\rho$ by applying a weighted least square method in which the magnitude (validation gate) $(\det(P_{int}^i))$ of covariance that allows the measured data of the reference sensor among accumulated data to be a true value is utilized as a weighting factor $\omega_i$.

The calibration module 145 may utilize accumulated data of a square value of a difference between the measured data of the reference sensor and the calibration data of the sensor to be diagnosed as a cost function. The calibration module 145 may reduce the cost function as the calibration data of the sensor to be diagnosed is similar to the measured data of the reference sensor. Therefore, the calibration module 145 may calculate the calibration parameters $\alpha$ and $\beta$ that minimize the cost function Q of the following equation 5:

$$\text{Min} Q = \sum_{i=0}^{n} \omega_i [y_{ref}^i - f(x_{uss}^i, \alpha, \beta)]^2 \quad \text{[Equation 5]}$$

Here, $y_{ref}^i$ is the measured data of the reference sensor; $x_{uss}^i$ is the measured data of the sensor to be diagnosed before calibration; and $f(x_{uss}^i, \alpha, \beta)$ is the measured data of the sensor to be diagnosed after calibration, which are represented by the following equation 6:

$$f(x_{uss}^i, \alpha, \beta) = \alpha \cdot x_{uss}^i + \beta \quad \text{[Equation 6]}$$

In an exemplary embodiment, the calculation of the calibration parameters $\alpha$ and $\beta$ for sensor calibration using the cost function is illustrated by way of example, but is not limited thereto. Modifications and variations may be made thereto.

Figure 4:
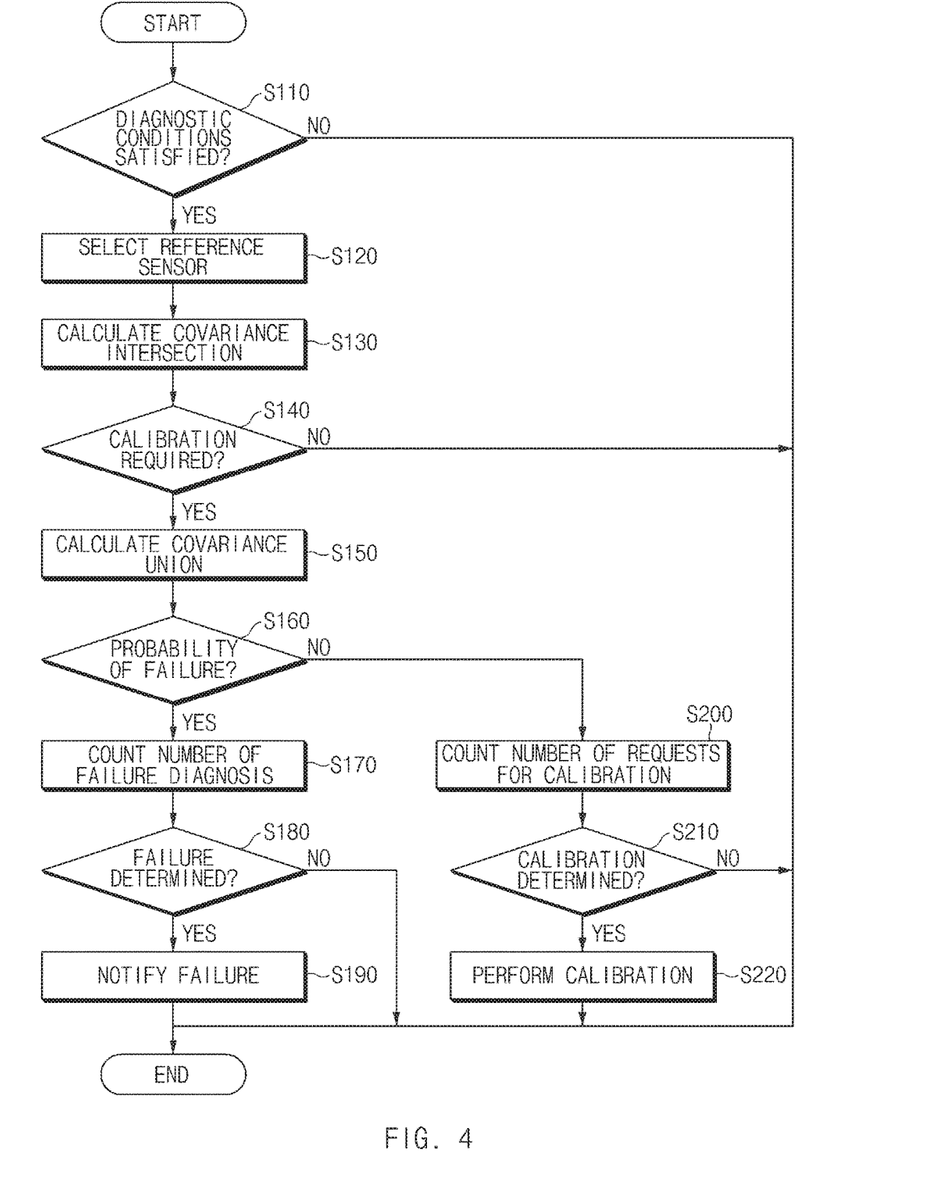
FIG. 4 is a flowchart illustrating a method for failure diagnosis and calibration of sensors for ADAS, according to an exemplary embodiment of the present disclosure.
Figure 5:
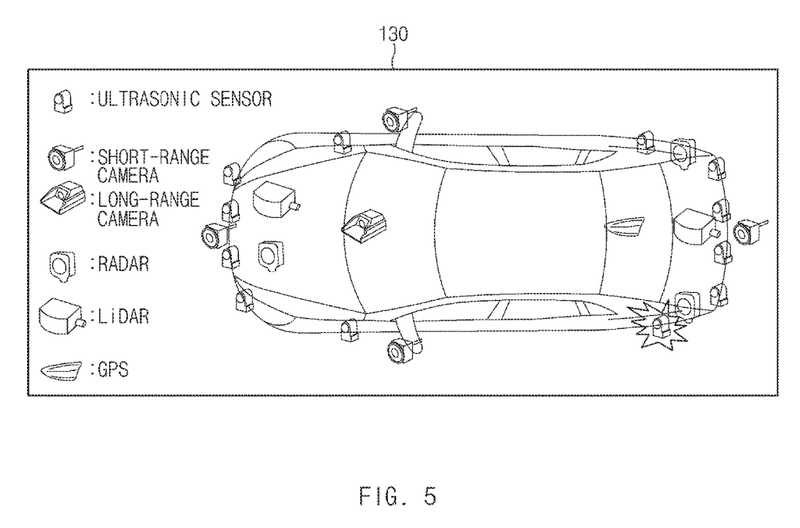
FIG. 5 illustrates a sensor failure alarm output, according to an exemplary embodiment of the present disclosure.

FIG. 4 illustrates a flowchart of a method for failure diagnosis and calibration of sensors for ADAS, according to an exemplary embodiment of the present disclosure. FIG. 5 illustrates a sensor failure alarm output, according to an exemplary embodiment of the present disclosure.

The reference selection module 141 of the processor 140 may determine whether or not diagnostic conditions for initiating the diagnosis of states of sensors are satisfied in operation S110. For example, the reference selection module 141 may verify whether or not an object is present in a common measurement area of two or more sensors to determine whether or not the diagnostic conditions are satisfied.

When the diagnostic conditions are satisfied, the reference selection module 141 may analyze reliability (accuracy) of the two or more sensors mounted in the vehicle and select a single sensor having the highest reliability as a reference sensor in operation S120. Here, the two or more sensors may measure homogeneous data (for example, distance or speed) with respect to the object positioned in the common measurement area, and include at least one of the GPS sensor 111, the ultrasonic sensor 112, the RADAR sensor 113, the LiDAR sensor 114 and the camera 115.

When the reference sensor is selected, the diagnosis module 143 of the processor 140 may calculate covariance intersection of error covariance information of the reference sensor and error covariance information of a sensor to be diagnosed in operation S130. The diagnosis module 143 may combine a measurement error range of the reference sensor and a measurement error range of the sensor to be diagnosed to set a validation gate $G_{\gamma,int}$ for determining whether or not calibration is required. Here, the validation gate may set an allowable error range for determining whether or not calibration is required.

The diagnosis module 143 may verify whether or not the degree of error (the degree of distribution) between measured data of the reference sensor and measured data of the sensor to be diagnosed is within a reference range to determine whether or not calibration is required. The degree of error between the measured data of the reference sensor and the measured data of the sensor to be diagnosed may be a Mahalanobis distance.

The diagnosis module 143 may verify whether or not the degree of error between the measured data of the reference sensor and the measured data of the sensor to be diagnosed is within the allowable error range for determining whether or not calibration is required to determine whether or not calibration is required in operation S140. In order words, the diagnosis module 143 may determine whether or not calibration is required according to whether or not the data measured by the sensor to be diagnosed is within the validation gate $G_{\gamma,int}$. The diagnosis module 143 may determine that calibration is not required when the Mahalanobis distance $D_{int}(Z_i)$ is less than the validation gate (valid area) $G_{\gamma,int}$, and determine that calibration is required when the Mahalanobis distance $D_{int}(Z_i)$ is greater than or equal to the validation gate $G_{\gamma,int}$.

When the calibration of the sensor to be diagnosed is required, the diagnosis module 143 may calculate a covariance union of error covariance of the reference sensor and an error covariance of the sensor to be diagnosed in operation S150. The covariance union may be utilized as a validation gate $G_{\gamma,uni}$ for determining whether or not the failure of the sensor to be diagnosed is detected.

The diagnosis module 143 may verify whether or not the degree of error between the measured data of the reference sensor and the measured data of the sensor to be diagnosed is within the validation gate for determining the failure to determine whether or not there is the probability of failure in operation S160. The diagnosis module 143 may calculate a Mahalanobis distance $D_{uni}(Z_i)$ between the measured data of the reference sensor and the measured data of the sensor to be diagnosed, and may determine that there is no probability of failure when the Mahalanobis distance $D_{uni}(Z_i)$ is within the validation gate, and there is the probability of failure when the Mahalanobis distance $D_{uni}(Z_i)$ is out of the validation gate.

When it is determined that there is the probability of failure, the diagnosis module 143 may count the cumulative number of failure diagnoses with respect to the corresponding sensor to be diagnosed whenever failure probability alarms are generated in operation S170. The diagnosis module 143 may record the number of failure diagnoses in the storage 120.

The diagnosis module 143 may verify whether or not failure is determined on the basis of the number of failure diagnoses in operation S180. For example, the diagnosis module 143 may finally determine the failure of the sensor to be diagnosed when the number of failure probability alarms is greater than or equal to a predetermined number (a threshold value).

Subsequently, the diagnosis module 143 may notify a driver of the failure of the sensor to be diagnosed through the output unit 130 in operation S190. The output unit 130 may output the failure of the corresponding sensor in a particular form that is recognized by the driver under control of the processor 140. For example, the output unit 130 may display the faulty sensor on a display screen, as illustrated in FIG. 5.

When there is no probability of failure of the sensor to be diagnosed in operation S160, the calibration module 145 may count the cumulative number of requests for calibration of the sensor to be diagnosed in operation S200. The number of requests for calibration may be stored as related data for subsequent calibration in the storage 120.

The calibration module 145 may verify whether or not the number of requests for calibration of the sensor to be diagnosed is greater than or equal to a threshold value to determine whether or not calibration is required in operation S210. For example, the calibration module 145 may determine that the calibration of the sensor to be diagnosed is required when the number of requests for calibration of the sensor to be diagnosed is greater than or equal to the threshold value.

When it is determined that the calibration of the sensor to be diagnosed is required, the calibration module 145 may perform the calibration of the sensor to be diagnosed in operation S220. In other words, the calibration module 145 may calculate calibration parameters by using equation 5 and equation 6. Since the calibration module 145 applies the calculated calibration parameters to the corresponding sensor, it may utilize measured data of the calibrated sensor.

Figure 6:
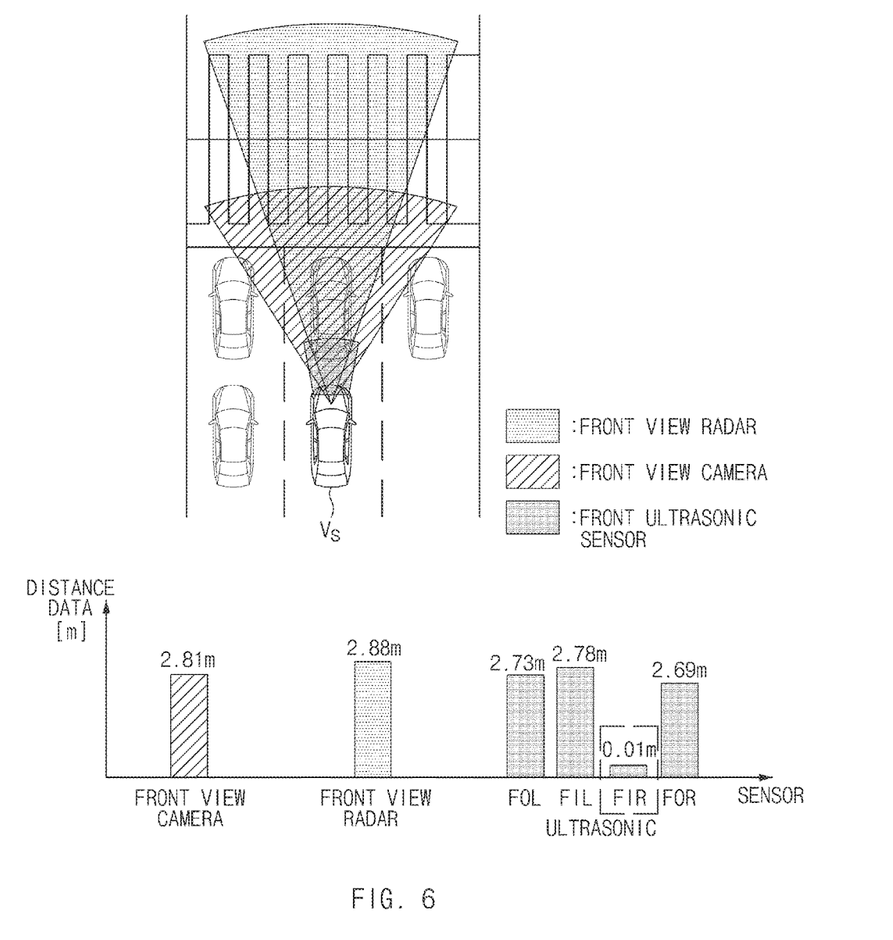
FIG. 6 illustrates a sensor failure diagnosis, according to an exemplary embodiment of the present disclosure.

FIG. 6 illustrates sensor failure diagnosis, according to an exemplary embodiment of the present disclosure.

As illustrated in FIG. 6, when an obstacle is positioned in front of a vehicle during driving and the vehicle is stopped for a predetermined time or longer, the processor 140 may obtain distance data, or a distance between the vehicle and the obstacle, with respect to the obstacle through a front-view camera, a front-view RADAR, and four front ultrasonic sensors provided at the front of the vehicle. The processor 140 may select, as a reference sensor, any one of the front-view camera, the front-view RADAR, and the four front ultrasonic sensors, compare measured data of the reference sensor with measured data of the other individual sensors, and determine a sensor having a deviation greater than or equal to a predetermined value as a sensor having the probability of failure. In other words, the processor 140 may determine that a front ultrasonic sensor FIR having a relatively high deviation (error) compared to the other sensors has the probability of failure.

The processor 140 may determine the failure of the corresponding sensor when the number of failure probability diagnoses is greater than or equal to a predetermined number, and may notify a driver of the failure of the corresponding sensor. In addition, the processor 140 may output an alarm notifying the failure of the sensor and guide the driver to take measures.

Figure 7:
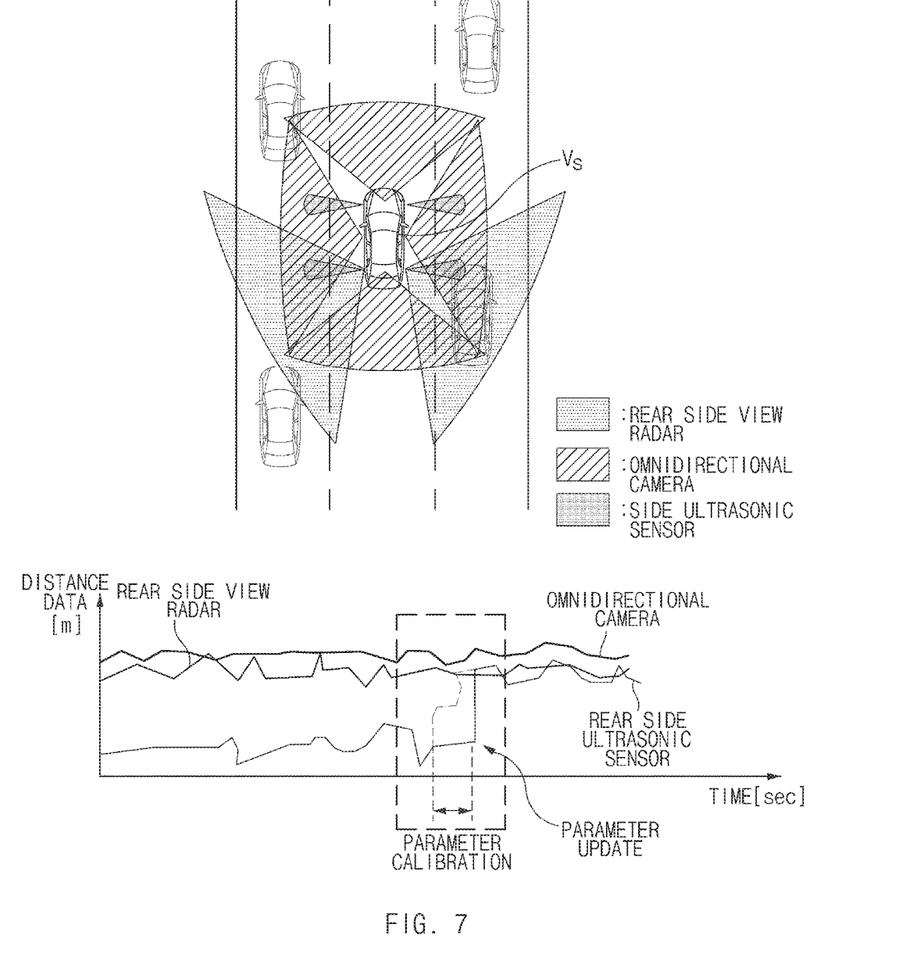
FIG. 7 illustrates a calibration of sensors, according to an exemplary embodiment of the present disclosure.

FIG. 7 illustrates the calibration of sensors, according to an exemplary embodiment of the present disclosure.

As illustrated in FIG. 7, when an obstacle is positioned in a measuring area in which measuring areas of rear side view RADARs, omnidirectional cameras, and side ultrasonic sensors overlap, the processor 140 may obtain distance data with respect to the obstacle through respective sensors.

The processor 140 may select, as a reference sensor, any one of the rear side view RADARs, the omnidirectional cameras, and the side ultrasonic sensors, and may compare measured data of the reference sensor with measured data of the other individual sensors. When the degree of error between the measured data of the rear side ultrasonic sensor and the measured data of the reference sensor is out of an allowable error range for determining whether calibration is required, the processor 140 may perform parameter calibration of the corresponding sensor. Then, the processor 140 may update the calibrated parameter to improve reliability with respect to the measured data of the rear side ultrasonic sensor.

As set forth above, the failure of sensors used in ADAS may be diagnosed without separate evaluation equipment.

In addition, the calibration of faulty sensors may be performed without separate calibration equipment.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for failure diagnosis and calibration of sensors for advanced driver assistance systems (ADAS), the apparatus comprising:
    a measuring unit including two or more sensors mounted in a vehicle;
    a storage configured to store characteristic data of each of the two or more sensors; and
    a processor configured to select one of the two or more sensors as a reference sensor and configured to determine whether or not a failure of the other sensor to be diagnosed is detected and whether calibration thereof is required, on the basis of error covariance information of the reference sensor wherein the characteristic data includes a mounting position, a measuring range, and error covariance information of the reference sensor.

2. The apparatus according to claim 1, wherein the two or more sensors measure homogeneous data with respect to an object positioned in a common measurement area of the two or more sensors.

3. The apparatus according to claim 2, wherein the reference sensor is any one of a global positioning system (GPS) sensor, an ultrasonic sensor, a radio detection and ranging (RADAR) sensor, a light detection and ranging (LiDAR) sensor, and a camera.

4. The apparatus according to claim 1, wherein the processor is further configured to
    select the reference sensor by analyzing reliability of the two or more sensors;
    compare measured data of the reference sensor with measured data of the sensor to be diagnosed, determine whether or not the degree of error is out of an allowable error range, and determine whether or not the failure of the sensor to be diagnosed is detected and the calibration of the sensor to be diagnosed is required; and
    calibrate a calibration parameter of the sensor to be diagnosed on the basis of the measured data of the reference sensor, when the calibration of the sensor to be diagnosed is determined to be required.

5. The apparatus according to claim 4, wherein the processor is further configured to analyze the reliability of the two or more sensors by using accuracy with respect to the measured data of the two or more sensors.

6. The apparatus according to claim 4, wherein the processor is further configured to analyze the reliability of the two or more sensors by using accuracy according to specifications of respective sensors.

7. The apparatus according to claim 4, wherein the processor is further configured to calculate covariance intersection of the error covariance information of the reference sensor and error covariance information of the sensor to be diagnosed to calculate an allowable error range for determining whether or not the calibration of the sensor to be diagnosed is required.

8. The apparatus according to claim 4, wherein the processor is further configured to calculate covariance union of the error covariance information of the reference sensor and error covariance information of the sensor to be diagnosed to calculate an allowable error range for determining whether or not the failure of the sensor to be diagnosed is detected.

9. The apparatus according to claim 4, wherein the processor is further configured to calculate a Mahalanobis distance between the measured data of the reference sensor and the measured data of the sensor to be diagnosed to calculate measurement errors of the reference sensor and the sensor to be diagnosed.

10. The apparatus according to claim 4, wherein the processor is further configured to calculate the calibration parameter that minimizes a difference between the measured data of the reference sensor and the measured data of the sensor to be diagnosed by using a cost function.

11. A method for failure diagnosis and calibration of sensors for advanced driver assistance systems (ADAS), the method comprising:
    determining whether or not diagnostic conditions for initiating diagnosis of two or more sensors mounted in a vehicle are satisfied;
    selecting one of the sensors as a reference sensor by analyzing a reliability of the two or more sensors;
    determining whether or not failure of the other sensor to be diagnosed is detected and whether calibration thereof is required, on the basis of error covariance information included in characteristic data of the reference sensor; and
    performing a process according to diagnostic results of the sensor to be diagnosed,
    wherein the characteristic data includes a mounting position, a measuring range, and error covariance information of the reference sensor.

12. The method according to claim 11, wherein, in the step of determining whether or not the diagnostic conditions are satisfied, it is determined whether or not an object is present in a common measurement area of the two or more sensors.

13. The method according to claim 11, wherein the step of determining whether or not the failure of the sensor to be diagnosed is detected and whether the calibration thereof is required comprises:
    calculating covariance intersection of the error covariance information of the reference sensor and error covariance information of the sensor to be diagnosed;
    verifying whether or not the degree of error between measured data of the reference sensor and measured data of the sensor to be diagnosed is out of an allowable error range set by the covariance intersection to determine whether or not the calibration is required;
    calculating covariance union of the error covariance information of the reference sensor and error covariance information of the sensor to be diagnosed, when the calibration of the sensor to be diagnosed is determined to be required;

verifying whether or not the degree of error between the measured data of the reference sensor and the measured data of the sensor to be diagnosed is out of an allowable error range set by the covariance union to determine whether or not there is probability of failure;

counting the cumulative number of failure diagnoses of the sensor to be diagnosed, when there is the probability of failure of the sensor to be diagnosed; and verifying whether or not the number of failure diagnoses of the sensor to be diagnosed exceeds a threshold value to determine the failure of the sensor to be diagnosed.

14. The method according to claim 13, wherein the step of determining whether or not there is the probability of failure further comprises:

counting the number of requests for calibration of the sensor to be diagnosed unless there is the probability of failure of the sensor to be diagnosed; and verifying whether or not the number of requests for calibration of the sensor to be diagnosed exceeds a threshold value to determine that the calibration of the corresponding sensor is required.

15. The method according to claim 14, further comprising calculating a calibration parameter that minimizes a difference between the measured data of the reference sensor and the measured data of the sensor to be diagnosed by using a cost function, when it is determined that the calibration of the corresponding sensor is required.

16. The method according to claim 13, further comprising outputting information notifying the failure of the sensor to be diagnosed, when it is determined that the failure of the corresponding sensor is detected.

* * * * *